United States Patent
Bond et al.

[19]

[11] Patent Number: 6,049,590

[45] Date of Patent: Apr. 11, 2000

[54] TELECOMMUNICATIONS SWITCH CONFIGURATION

[75] Inventors: Stuart Bond, Cambridge; Phillip William Hobson; Kevin John Twitchen, both of Herts, all of United Kingdom

[73] Assignee: Nortel Networks Corporation, Montreal, Canada

[21] Appl. No.: 08/913,548

[22] PCT Filed: Mar. 27, 1996

[86] PCT No.: PCT/GB96/00723

§ 371 Date: Mar. 23, 1998

§ 102(e) Date: Mar. 23, 1998

[87] PCT Pub. No.: WO96/31070

PCT Pub. Date: Oct. 3, 1996

[30] Foreign Application Priority Data

Mar. 27, 1995 [GB] United Kingdom .................. 9506236

[51] Int. Cl.[7] .............................. H04M 1/24; H04J 3/04; G06F 9/45

[52] U.S. Cl. .............................. 379/10; 395/701; 370/535

[58] Field of Search .................................. 379/10, 1, 2, 6, 379/9, 15, 26, 29, 219–230, 16; 371/13, 17; 395/500.43, 701, 705, 707, 710, 712; 704/4; 364/474.22; 370/353, 468, 487, 535

[56] References Cited

U.S. PATENT DOCUMENTS

| | | | |
|---|---|---|---|
| 5,218,605 | 6/1993 | Low et al. ........................... | 371/16.1 |
| 5,271,000 | 12/1993 | Engbersen et al. .................. | 379/10 |
| 5,384,823 | 1/1995 | Brenski et al. ...................... | 379/10 |
| 5,737,517 | 4/1998 | Kite et al. ........................... | 379/10 |
| 5,778,058 | 7/1998 | Gavin .................................. | 379/225 |

*Primary Examiner*—Paul Loomis
*Assistant Examiner*—Rexford N Barnie
*Attorney, Agent, or Firm*—Lee, Mann, Smith, McWilliams, Sweeney & Ohlson

[57] ABSTRACT

Originating instructions are generated from a functional definition of a plurality of interacting modules. These modules have respective internal functional specifications and interfacing specifications. The originating instructions are converted into control instructions that are downloaded for execution by said telecommunications switching means. Instructions are tested using testing procedures before the control instructions are downloaded. The testing procedures are generated by processing the interfacing specifications.

6 Claims, 15 Drawing Sheets

0 < x < 10        1001

9 < y < 100       1002

Z = TRUE, FALSE   1003 a = "aa", "a", "aaa"   1004

Fig. 10a

| x | y | z | a |
|---|---|---|---|
| 1 | 10 | TRUE | "aa" |
| 9 | 11 | FALSE | "a" |
| 2 | 30 | | "aaa" |
| 8 | 49 | | |
| 5 | 99 | | |

Fig. 10b

| TEST CASE | x | y | z | a |
|---|---|---|---|---|
| 1 | 1 | 10 | TRUE | "aa" |
| 2 | 9 | 11 | FALSE | "a" |
| 3 | 2 | 30 | FALSE | "aaa" |
| 4 | 8 | 49 | FALSE | "aaa" |
| 5 | 5 | 99 | FALSE | "aaa" |

Fig. 10c

```
1 2 3 4 5 6    Post Conditions
-----------    ---------------
T              swerrorint(CAST tlirc AS INT),RETURN FALSE F T            ethernet_type_str -> tempstr F   T          fts_type_str -> tempstr F     T        bad_hwtype_str -> tempstr T       CAST (CAST entry_ptr AS $UNIVERSAL_PTR)
               AS t_bootp_internal_info_ptr -> info_ptr

T T   RETURN FALSE

T   TRUE -> link_clear, nexting1(bootp_internal_db_q,
               entry_ptr) -> entry_ptr

RETURN TRUE
```

*Fig. 11*

```
1 2 3 4 5 6   Post Conditions
------------  --------------------------------------------
T             swerrorint(CAST tlirc AS INT),RETURN FALSE F T           ethernet_type_str -> tempstr F   T         fts_type_str -> tempstr F     T       bad_hwtype_str -> tempstr T     CAST (CAST entry_ptr AS $UNIVERSAL_PTR)
              AS t_bootp_internal_info_ptr -> info_ptr

T T     RETURN FALSE

T     TRUE -> link_clear, nextingl(bootp_internal_db_q,
              entry_ptr) -> entry_ptr

RETURN TRUE
```

*Fig. 12*

| 1 | 2 | 3 | 4 | 5 | 6 | Post Conditions |
|---|---|---|---|---|---|---|
| T | | | | | | swerrorint(CAST tlirc AS INT), RETURN FALSE |
| F | T | | | | | ethernet_type_str -> tempstr |
| F | | T | | | | fts_type_str -> tempstr |
| F | | | T | | | bad_hwtype_str -> tempstr |
| | | | | T | | CAST (CAST entry_ptr AS $UNIVERSAL_PTR) AS t_bootp_internal_info_ptr -> info_ptr |
| | | | | T | T | RETURN FALSE |
| | | | | | T | TRUE -> link_clear, nextingl(bootp_internal_db_q, entry_ptr) -> entry_ptr |
| | | | | | | RETURN TRUE |

*Fig. 13*

TELECOMMUNICATIONS SWITCH CONFIGURATION

The present invention relates to a processing means and a method for testing originating instructions for telecommunication switching apparatus.

BACKGROUND OF THE INVENTION

In recent years it has been appreciated that the modification of control instructions in major systems is by no means a straightforward matter and over the years improved techniques have been developed for constructing large collections of instructions for operation in real time, in environments where errors could result in major systems failure.

A significant amount of time and money was often spent in the development of control instructions and, although it is often desirable to make upgrades, it is also desirable to obtain maximum benefit from existing code. Although the size of existing instruction is large and is often not consistent with modern development techniques, it does in itself provide two distinctive advantages. Firstly, it exists, and does not require additional investment in order for it to be created. Secondly, given the fact that generally, it will have been in operation for several years, it is tried and tested.

To an operational manager deriving benefits from existing systems, the associated instructions are perceived as something of great value, and is often referred to as "heritage" code. However, to the development engineer, the existing code provides major problems, in that it, generally, is not consistent with modern techniques and modern procedures. In particular, it has been found in recent years that object-oriented environments are particularly suited to defining telecommunications functionality, given their inherent modularity. Development Engineers tend not, therefore, to see existing earlier instruction suites in such glowing light and tend to refer to them as a "legacy" to be tolerated, rather than an inheritance to be appreciated!

When presented with a legacy system of this type it is not uncommon to be referring to several million lines of executable statements and maintenance engineers may adopt one of two clear strategies.

Firstly, they could continue to operate in the manner anticipated by their predecessors. Thus, they would continue to use the earlier techniques and develop systems in accordance with the tried and trusted methods. The second option would be to effectively discard all of the previous legacy instructions and start again, defining each of the modules in accordance with modern object-oriented techniques. However, although appearing to be attractive, such a strategy would in itself present several risks. Firstly, it is possible that the investment required would be too large, thereby creating an intolerable burden in terms of the development costs. Secondly, it is likely that the systems must interface with other systems, therefore it would not be entirely possible to disregard all of the legacy systems because they may belong to another party. Thirdly, a major re-write of all of the instructions would take a significant period of time. It is therefore possible that procedures adopted at the beginning of a development process, although modern in their time, would rapidly become out of date.

It is often possible to add modified and enhanced modules of instruction to existing large instruction sets. However, in order to do this it is necessary to accurately specify the way in which the new module must interface with existing modules. Furthermore, once a new module has been developed it is necessary to test it before it actually goes on-line. Testing is preferably performed automatically, at great speed, but it is necessary to develop suitable testing routines, sometimes referred to as test cases.

International Switching Symposium—Paper C10.2, vol. 2, October 1992, Yokohoma (JP), pages 439–443, XP000337756, Rouger et al: "Test cases generation from formal specifications" see page 441, paragraph 4 shows methods of generating test cases, and problems associated with such methods. In one approach, based on SDL, a global system behaviour of several modules is determined, paths are extracted from the system behaviour, and the paths are split between external interfaces. However, there is no disclosure of determining interface specifications of individual modules.

U.S. Pat. No. 4,617,613 shows a system for testing a communication system having a message based architecture. A message utility generates, manipulates, and verifies responses to, sequences of messages passed between a control system and the network being controlled. However, the message utility generates messages on the basis of scripts entered in a high level language by an operator, and thus there is considerable manual input, and no disclosure of determining interface specifications of modules.

SUMMARY OF THE INVENTION

According to a first aspect of the present invention, there are provided processing means as set out in claim 1.

Preferably the processing means comprises converting means for converting the test procedures into control instructions for calling the module under test.

In a preferred embodiment, the test procedure generating means includes means for defining interface paths and respective conditions required for the activation of said paths.

According to a second aspect of the present invention, there is provided a method as set out in claim 4.

BRIEF DESCRIPTION OF THE DRAWINGS

The invention will be described by example only, with reference to the accompanying figures, in which:

FIGS. 10A, 10B and 10C illustrate the process of generating values from boundary value analysis shown in FIG. 8.

FIG. 11 illustrates a behaviour matrix used in the correlation of pre-conditions and post-conditions; and FIGS. 12 and 13 illustrate a method of interpretation of the behaviour matrix of FIG. 11.

DESCRIPTION OF PREFERRED EMBODIMENT

Figure 1:
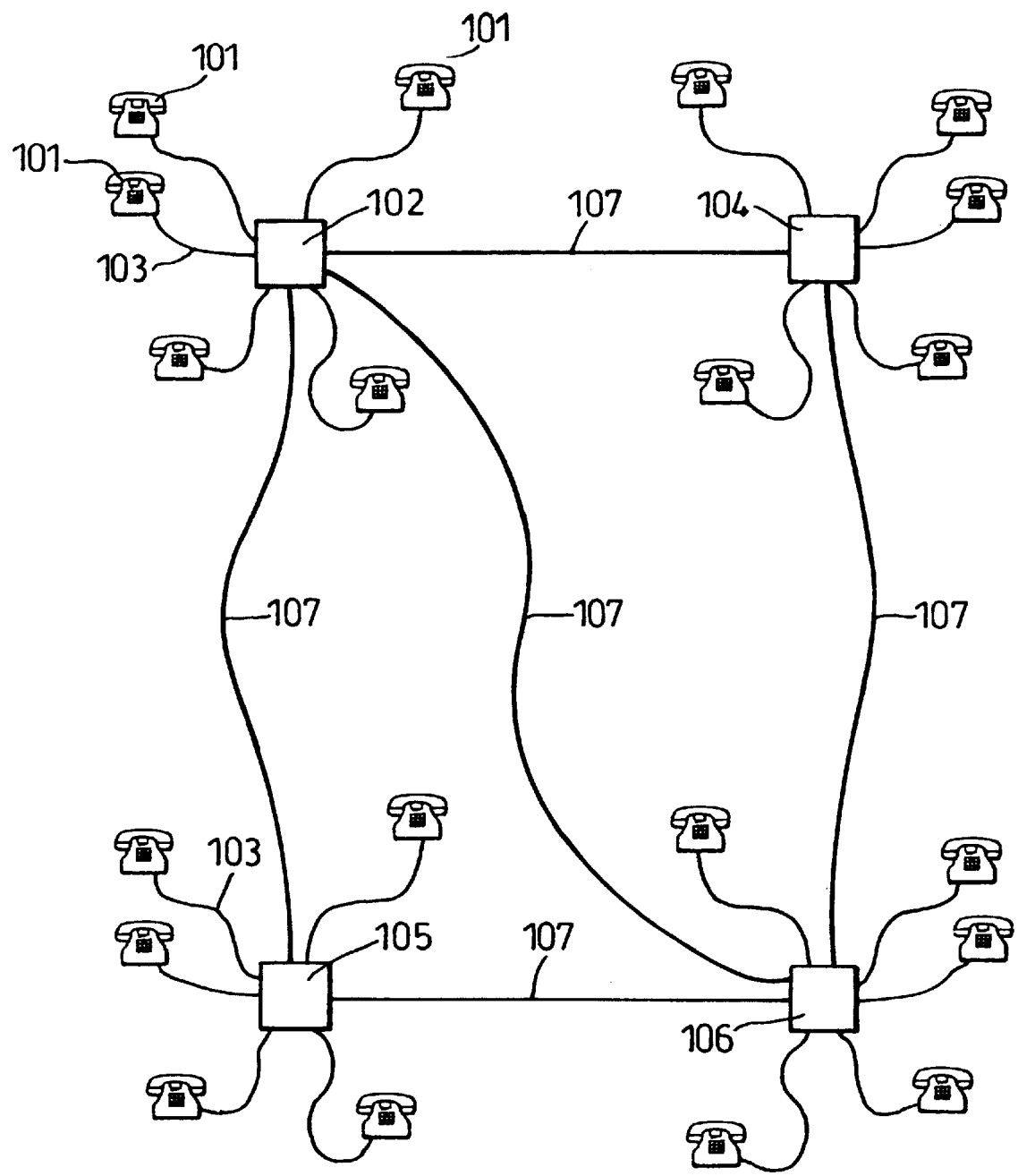
FIG. 1 shows a telecommunications network including telephones and telecommunications switches.

A classical telecommunications environment is shown in FIG. 1, in which a plurality of analogue telephones 101 are connected to a local exchange 102 via respective communication links 103 in the form of a twisted pair of copper conductors. The local exchange 102 is also connected to other similar other exchanges 104, 105 and 106 and in a real network, the number of local exchanges connected to the network would be very large indeed, covering large geographical areas.

The local exchanges are connected via trunk cables 107 and traditionally these trunk cables were also provided in the form of copper conducting cables. Consequently the cost of providing all this cabling was quite significant and represented a substantial proportion of the overall cost of the network. The total cost of the switching apparatus was relatively low, therefore more could be invested on this apparatus in an attempt to maximise the efficiency of the available cable. This lead to the frequency division multiplexing, so as to increase the number of communication channels which could be conveyed along a common physical link.

The ability to increase the number of transmission paths provided by a single physical link was enhanced in the 1970s by the utilisation of digital transmission techniques, which allowed many pulse code modulated signals to be combined by a process of byte multiplexing. Thus, a 4 kilohertz analogue telephone signal could be represented as a 64 kilobit per second digital bit stream, whereafter thirty of such channels could be combined, together with signalling information to provide a 2.048 megabit per second multiplex.

In order to facilitate digital transmission of this type, characteristics of the exchanges, such as exchanges 102, 104, 105 and 106 in FIG. 1, became increasingly complex and significant circuit design was required in order to provide platforms which in turn could make available the required level of functionality. Thus, no longer were local exchanges merely required to provide switching mechanism for analogue signals, they were required to provide analogue-to-digital conversion, time switching, in addition to space switching, and multiplexing, where appropriate, for transmission over multiplexed trunk cables.

It was soon realised that the level of multiplexing could be increased and standards were established for transmitting at 140 megabits per second and 565 megabits per second, effectively giving a deep hierarchy of available bit rates.

The transmission of digital data over substantial bandwidth provision, enabled other communications services to be incorporated within a network which was originally provided solely for the transmission of relatively low bandwidth speech signals. As soon as it became apparent that a premium charge could be placed on data transmission of this type the race was on for establishing connection points within existing networks for commercial purposes. Thus, in addition to speech telephones being connected through switched telephone networks, it became possible to connect data processing equipments separated by large geographical distances and thereby significantly improve the overall flow of data between displaced sites. This process was further enhanced by the introduction of synchronous transmission systems which in turn facilitated data ports to be provided at many different data rates, without disrupting the overall integrity of the multiplexing and transmission systems. This in turn lead to a vast expansion in the number of services which could provided within the network and the level of intelligence which could be embedded within the network. A retention of hard-wired switching sub-systems would have effectively lead to a stagnation of this expansion process and it therefore became inevitable that switching systems of this type would be replaced with adaptable programmable systems, in which general purpose hardware switching matrices would be configured in response to executable instructions. Thus, as far as the switching sub-system is concerned, local executable instructions may be considered as the means by which a switching functionality, in terms of actual hardware components, is configured, so as to provide a level of system functionality within the network environment.

Figure 2:
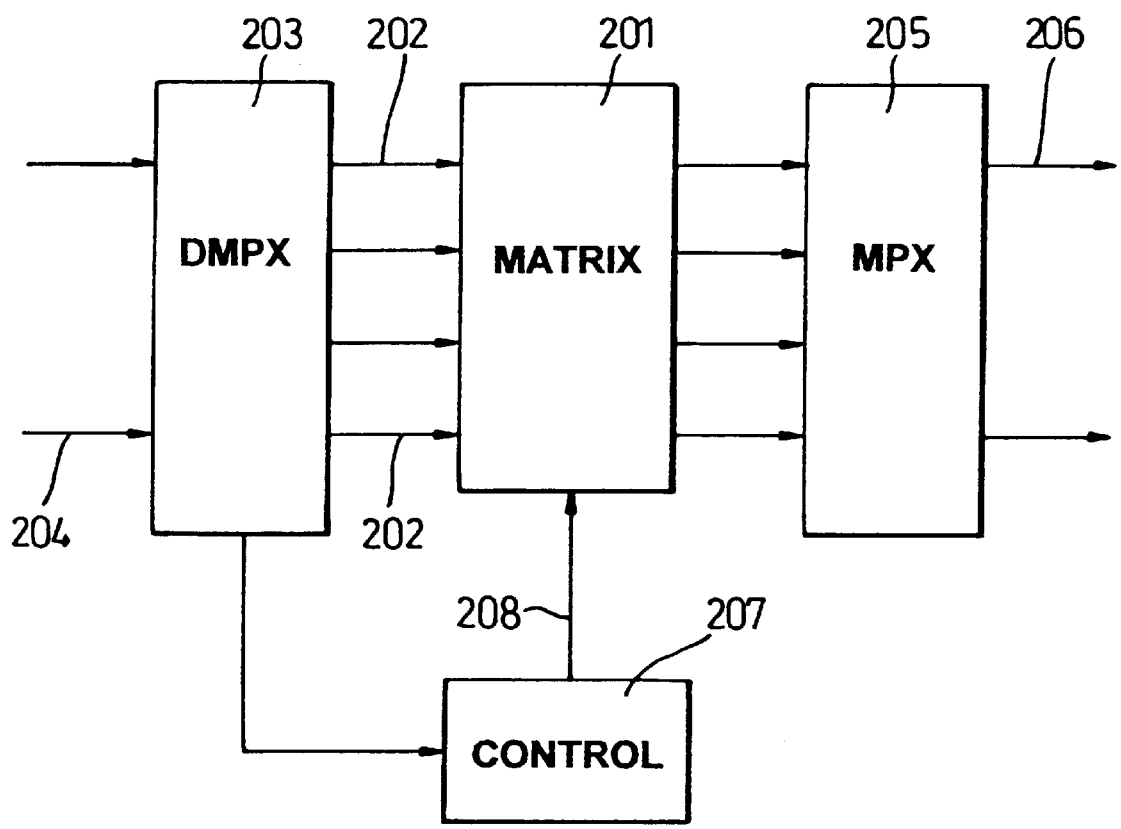
FIG. 2 details construction of a telecommunication switch of the type shown in FIG. 1, including controlling means.

A typical switching sub-system operating under these conditions is illustrated in FIG. 2. A switching matrix 201 receives input channels 202 from a de-multiplexing device 203. The de-multiplexing device 203 in turn receives trunk cables 204, each arranged to convey a plurality of-multiplexed signals.

Each line 202 supplied to the matrix 201 includes a thirty channel time multiplex and within the matrix 201 time switching occurs, in which the positions of time slots are re-arranged and space switching occurs in which data conveyed within a particular multiplex is switched to another multiplex. Thereafter, the switched time multiplexes are supplied to a re-multiplexing circuit 205, which in turn provides outputs on trunk cables 206, conveying higher order digital multiplex signals.

The matrix 201 itself contains all the physical elements required to perform switching operations. The actual switching operations themselves are effected under the control of the central controlling device 207, that is itself arranged to execute control instructions and supply control signals to the matrix 201 over control lines 208.

Figure 3:
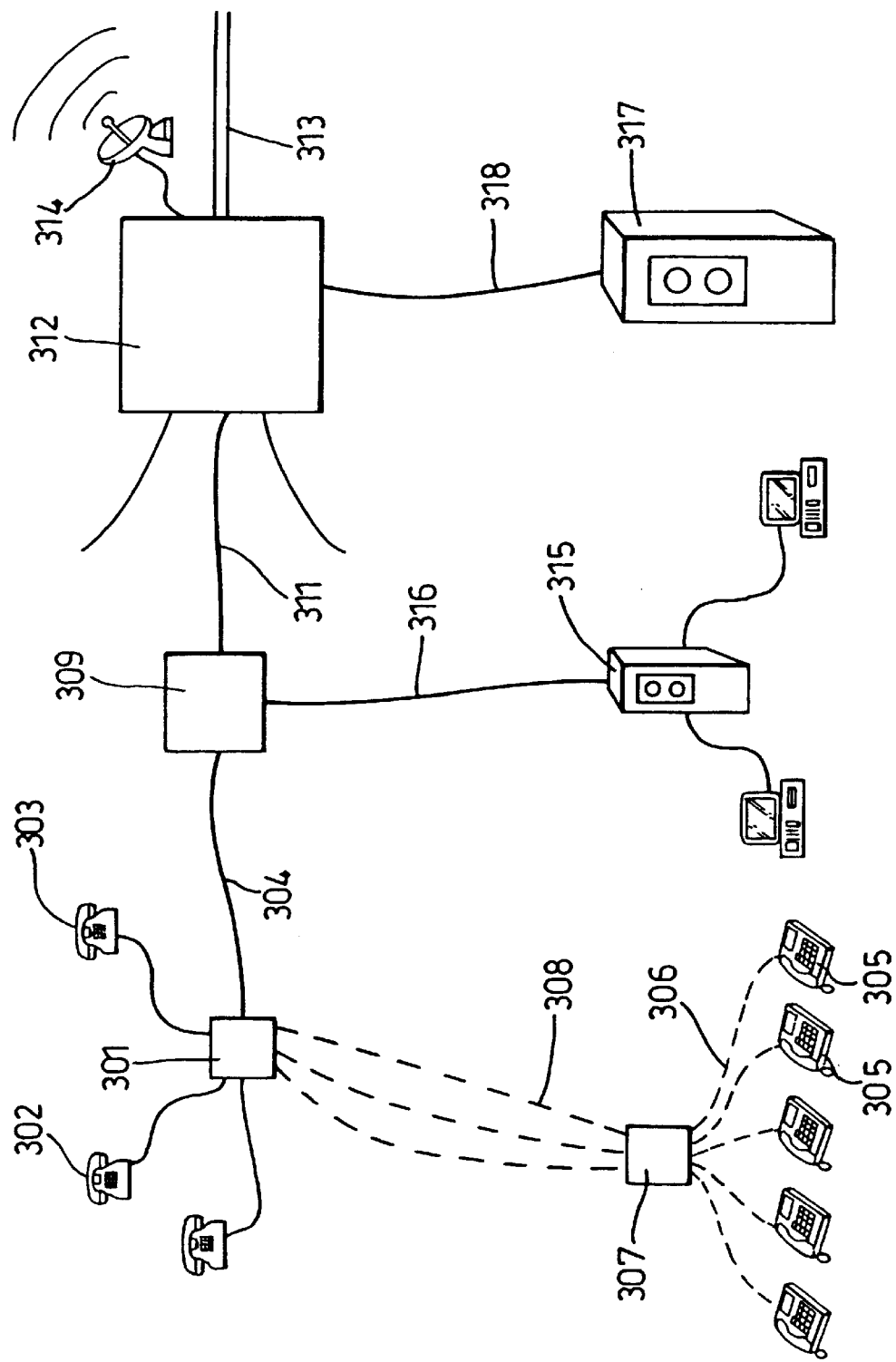
FIG. 3 shows further details of the telecommunications network shown in FIG. 1, including a controlling system.

Digital switching sub-systems of the type shown in FIG. 1 allow telecommunications networks to be built up, as illustrated in FIG. 3. Thus, in FIG. 3 a local exchange 301 is similar to local exchange 102 shown in FIG. 1. Similarly telephones 302 and 303 may be identical to telephones 101 shown in FIG. 1 and communicate with the local exchange 301 over analogue twisted pairs. However, at the local exchange the analogue signals are converted into digital signals, thereby facilitating transmission over trunk cables, such as trunk cable 304, in the form of a time division multiplex.

Given that local exchange 301 operates within a digital environment, it is also configured to communicate with digital telephones 305. These digital telephones are connected, via digital communication channels 306, to a line concentrator 307. Thus, in the example shown in FIG. 3, five digital telephones 305 are connected to the concentrator 304, but only a total of three digital lines 308 are provided in order to connect the concentrator 307 to the local exchange 301. At the local exchange 301 analogue signals received from telephone 302 and 303 are converted into digital signals and combined with digital signals and combined with digital signals originating from concentrator 307 such that, from the rest of the networks standpoint, the signals are effectively equivalent.

The trunk cable 304 in the example shown in FIG. 3 is arranged to convey a thirty channel multiplex. However, this cable is supplied to an intermediate exchange 309, arranged to receive similar multiplexes, such as on-line 316, and thereafter combine these multiplexes into a higher order of multiplexing for transmission over a trunk cable 311. Similarly, a further level of concentration may be provided at an intermediate switching station 312 which in turn provides an even higher level of multiplexing for transmission over trunk cable 313. Furthermore, signals multiplexed to this level of concentration may also be supplied to microwave links, illustrated by microwave dish 314.

The multiplexing performed by the configuration shown in FIG. 3 is synchronous, such that it is possible for a 2 megabit link to be provided to a data processing facility 315 over a direct data digital communication 316. Thus, at the intermediate exchange 309, the digital multiplex received from processing station 315 may be considered in a substantially similar way to the speech multiplexes received on communication trunks 314 and 310.

Similarly, intermediate exchange 312 may provide an even higher digital bandwidth, say 64 megabits per second, to a high powered data processing system 317 over a direct digital link 318. Again, at digital exchange 312, data received over the communication path 318 is considered in substantially the same way as the multiplex received from exchange 309 over trunk 311.

The ability to reconfigure the functionality of individual operating sub-systems, in response to executable instructions, facilitates the construction of complex communication environments as shown in FIG. 3. In addition, it will readily be appreciated that a first level or layer of instructions may be provided in order to control the operations of individual components, with higher layers of functionality being provided in order to co-ordinate the operation of individual sub-systems within the overall network. Thus, the development of systems of this type has lead to a hierarchical and modular approach.

In conventional communication networks, hierarchies were effectively geographical and the provision of resources were dictated by the allocation of bandwidth. However, due to increasing levels of multiplexing and the introduction of relatively inexpensive optical fibre links, the cost of transmitting signals over large distances has reduced dramatically. Therefore, the hierarchy of distributed switching systems may be considered in terms of their functionality, rather than their geographical displacement.

Figure 4:
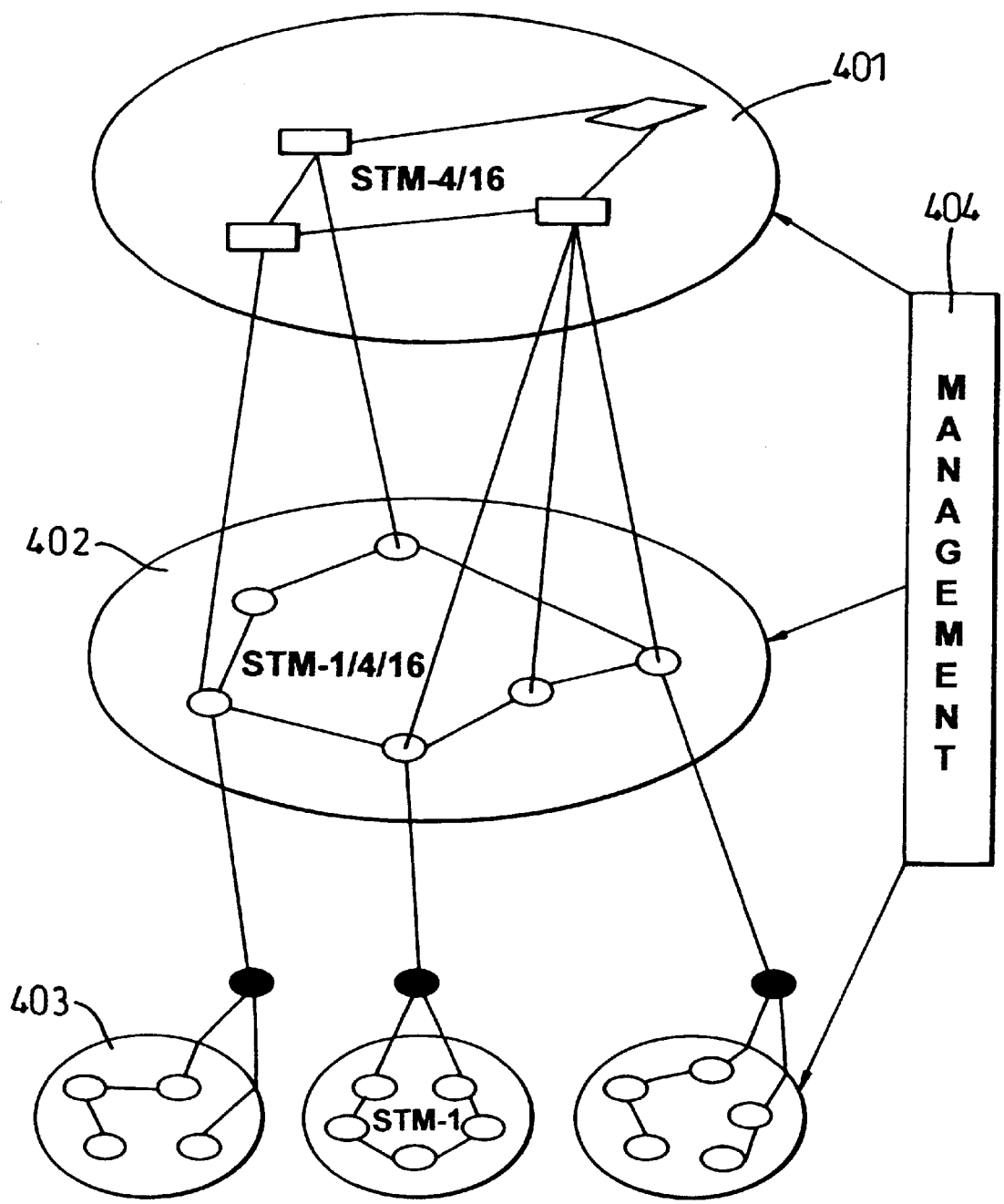
FIG. 4 details levels of multiplexing functionality contained within the control system shown in FIG. 3.

An illustration of this hierarchical approach is shown in FIG. 4. Thus, a first tier 401 of communication represents the highest level of bandwidth communication, provided between central switching sites, which may in turn be distributed globally. Below this a second tier 402 unifies switching operations being performed at a lower concentration of multiplexing, with a similar reduced level of multiplexed communication occurring at a third tier of operation 403.

Each unit within the tier will have its own set of control instructions, with control instructions coordinating operations within a tier and an overall operational control being effected at a management control level 404.

In addition, greater levels of functionality may be provided to individual telephone subscribers, providing services as call forward and automatic redial etc. Preferably a modular approach is adopted in terms of creating modules of instructions, ultimately executable on switching sub-systems. Instructions usually consist of identifiable lines, and in many situations the number of instruction lines may run into many thousands, possibly millions.

Thus the generation of so many instructions requires the use of a modular approach, such that the task of generating instructions may be split between several teams of engineers or individual engineers in order to make the task of generating the instructions realistically achievable. By defining the desired functionality of the switch in terms of the functionality of a plurality of instruction modules, development of increasingly complex switching sub-systems is facilitated to a degree which would not be possible if a less than modular approach had been adopted.

Figure 5:
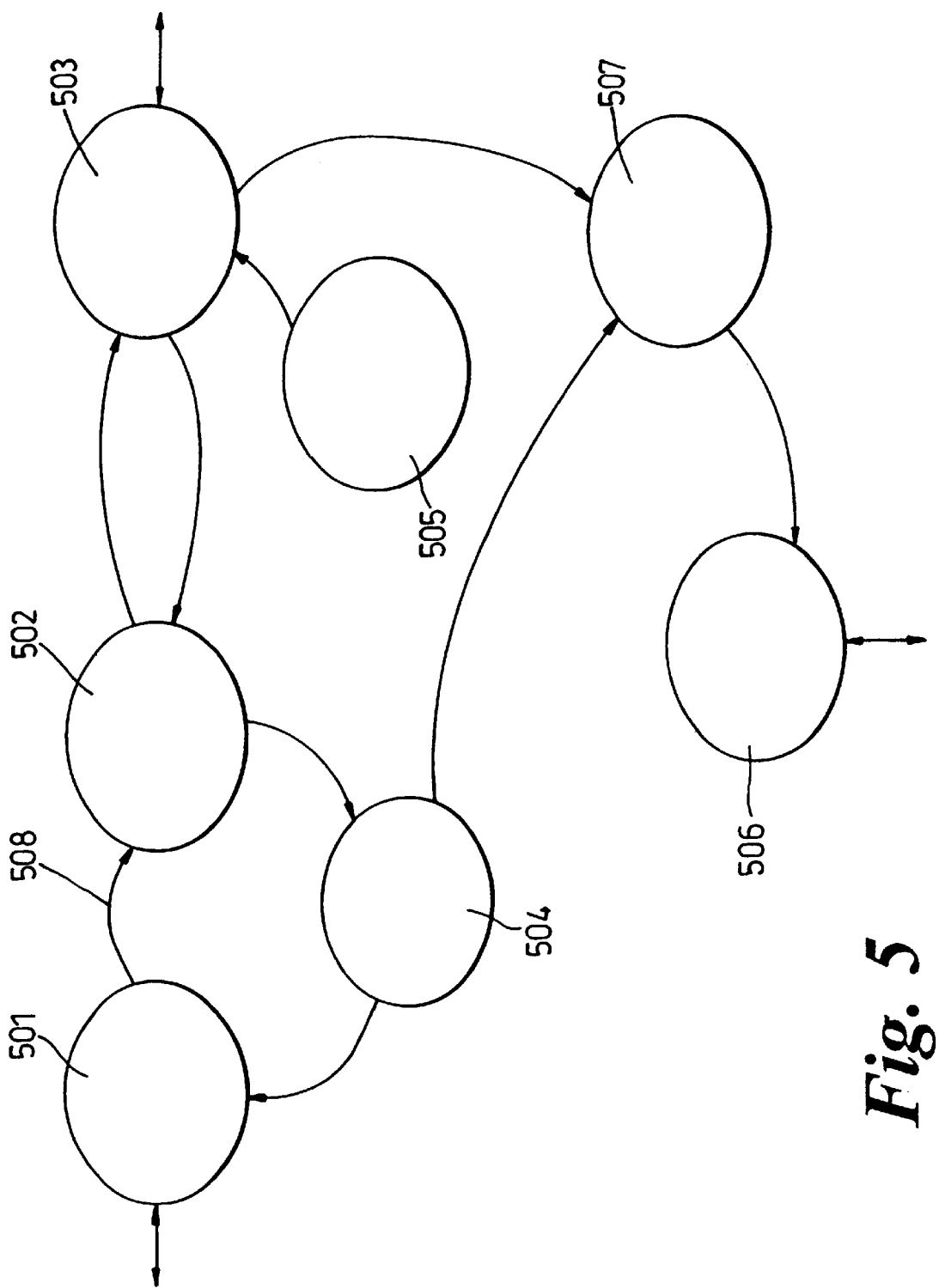
FIG. 5 details modules of functionality contained within the control system shown in FIG. 3.

A graphical representation of a set of instruction modules is illustrated in FIG. 5. It should be noted that the modules in FIG. 5 do not directly relate to the bandwidth hierarchy shown in FIG. 4. Different modules may interact with the same level of bandwidth, and different bandwidth may interact with the same module. Thus, in FIG. 4, the instructions are identified as residing within respective modules.

A set of instructions, possibly in the form of several files, each containing several thousand lines of instructions, are present within a module 501, with a similar set within module 502, a similar set within module 503 and so on for modules 504, 505, 506 and 507. FIG. 5 is merely illustrative and in a real working set of instructions the number of modules present may be significantly larger.

The arrows connecting the modules shown in FIG. 5 represent their inter-dependency. Thus, when instructions resident within module 501 are being executed, these instructions may in turn make a call to instructions within module 502, illustrated by arrow 508. Similarly, 502 may call module 503, which in turn may also call back to module 502 or call module 507.

Thus, although the task of generating new instructions to perform complex functions on a switching sub-system is simplified by the adoption of a modular approach, a complex series of interactions between modules exists, and this may provide scope for mistakes in the instructions to go unnoticed due to the sheer complexity of the manual testing procedure which would be required to exhaustively test functionality. Thus it is difficult to develop a switching sub-system which relies on the integrity of several thousand lines of instructions.

A known method of defining and testing the functionality of instructions is "SDL" (Specification Description Language). In SDL, each operation, corresponding to one or a few lines of instructions, is defined using a graphical flowcharting method, whereby a processing system is used to build up a full description of the operationality of an entire sub-section or module of instructions. It is also possible to link SDL descriptions of modules together such that an overall logical description of the functionality of all of the instructions is defined. The SDL description may be supplied to engineers, for translating on a module-by-module basis into specific instructions. Alternatively, tools are available for automatically translating the SDL description into a set of instructions encoded in the language such as C or C++. However, it is known that instructions generated in this way are extremely difficult to read by a human operator, compared to instructions which have been generated manually. Thus automatic instruction generation from SDL makes it even more difficult to understand where an error may exist within the entire set of instructions.

An advantage of the use of a description language such as SDL, is that it is possible to simulate execution of the instructions before they are actually used on a real telecommunications switch. Thus it may be possible to discover errors in the design of the operationality of the telecommunications switch before it is actually used in the real world. However, the permutations of operationality are practically infinite. Thus, it is not possible to determine with any degree of certainty that errors do not exist somewhere in the definition of the operations of the switching sub-system.

It should be appreciated from the inter-dependency of modules illustrated in FIG. 5, that it is not possible to construct instructions for module 507 in complete isolation. Careful consideration must be taken of the interactivity of the instructions contained within module 507 with its co-operating modules. Thus, a specification must be drawn up which details the required level of functionality required by module 507. However, in addition, the specification must also include a detailed description of how module 507 communicates or interfaces with the rest of the overall instruction environment. Thus, in a particular example, it can be seen that module 507 is itself invoked in a response to a call originating from module 503 or module 504. Thus, instructions contained within module 507 must be responsive to these particular types of invocations, which will be set in accordance with instructions resident within modules 503 and 504. Modules 503 and 504 will invoke module 507 in their particular way, therefore this definition must include an interface specification. Similarly, module 507 is itself required to invoke the assistance of module 506 and again the particular nature of this invocation will be specified, such that the interface between modules 507 and 506 is maintained.

Ultimately, control signals and other types of signals must be generated by the overall set of instructions and, similarly, the instructions will be arranged to receive signals emanating from their local exchange hardware and, probably, emanating from other units within the overall structure. Thus, as shown in FIG. 5, modules 501, 503 and 506 are arranged to perform communications with external devices and the nature of these communications must also be specified for the respective module interfaces. Thus, before work can start in preparing new instructions for a particular module, it is necessary to accurately define its interface with other modules within the set of instructions.

Given the importance of a module's interface, it can be understood that conformity to module interface specifications is essential for the collection of modules shown in FIG. 5 to co-operate in order to achieve successful overall functionality. Thus, successful implementation of the interface is a key part of the overall instruction development. By testing module instructions to see if they comply with a respective module interface specification, it becomes possible to determine whether or not a module is likely to interact successfully within the environment for which it is designed.

Figure 6:
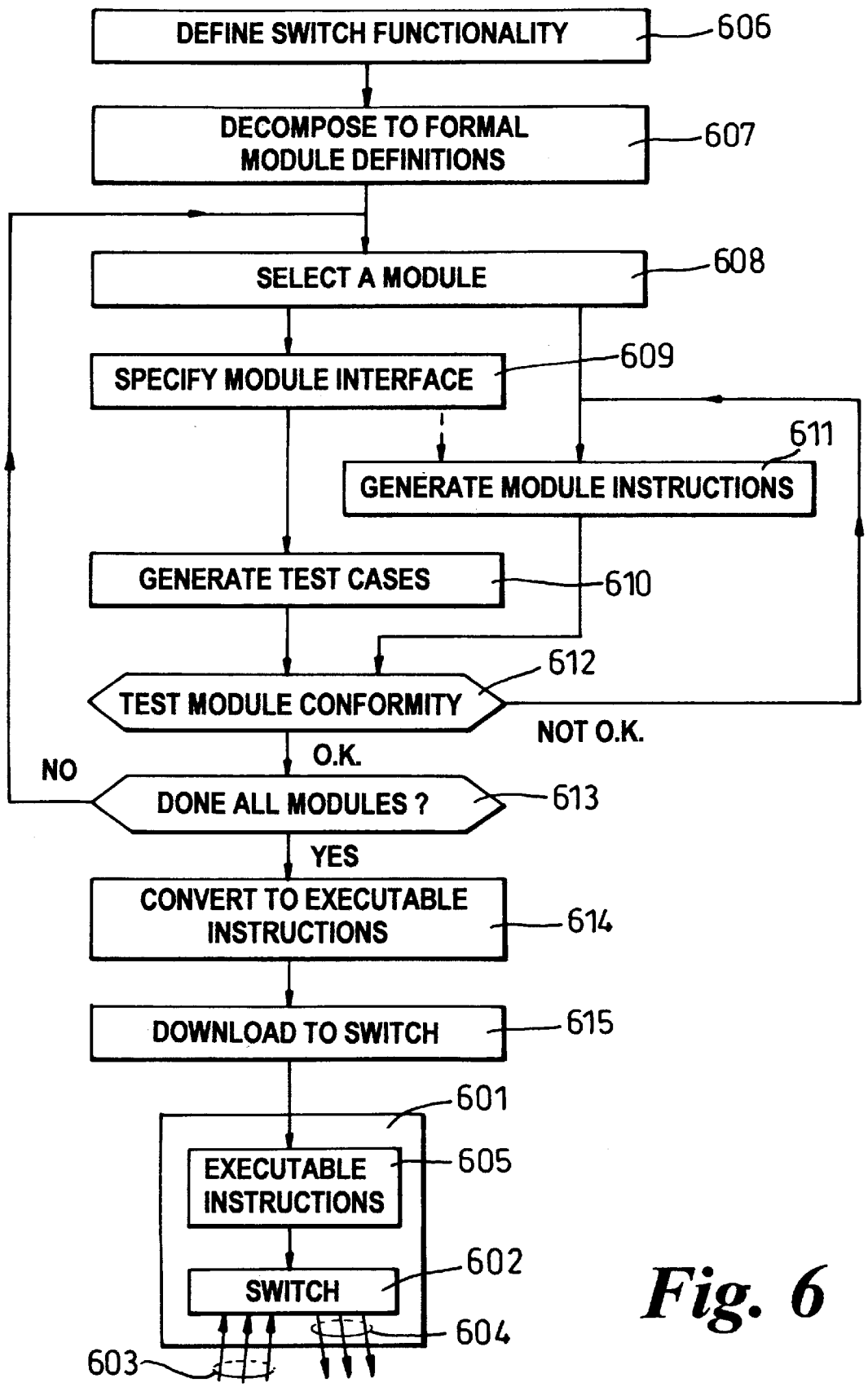
FIG. 6 details steps which are performed in order to implement a controlling system of the type shown in FIG. 3, including specifying a module interface and generating test cases.

A procedure for testing the conformity of module instructions to their respective interface specification is shown in FIG. 6. A switching system 601 includes a switch 602, arranged to receive incoming data on line 603 and to transmit outgoing data on line 604. The operation and configuration of switching mechanisms within switch 602 is actively controlled in response to the execution of executable instructions, received from a storage device 605.

In process 606 the desired functionality of the switching system 601 is defined. In process 607 the overall functionality defined in process 606 is decomposed into formal module definitions. Each module has a definition of its function and of the way in which it interacts with other modules which will operate in switching system 601. The process of converting the set of formal module definitions defined in process 607 into executable instructions stored on storage means 605 is summarised in processes 608 to 615.

In process 608 a module is selected for consideration. In process 609 the formal module interface definition created in process 607 is specified using a formal descriptive language such as SDL. In process 610 various parameters are given values such that when these parameters are supplied to a module under test, the result of simulated execution of the module may be observed in order to determine whether or not the module instructions conform to the formal module interface definition. After process 610 has been completed, control is directed to process 612. In parallel with processes 609 and 610, in process 611 module instructions are generated according to the formal module functional definition specified in process 607. After process 611 has been completed, control is directed to process 612.

In process 612 the test cases generated in process 610 are applied to the module under consideration whose instructions have been generated in process 611. In this way the modules conformity to the formal module interface definition specified in process 607 may be tested. If a module does not conform to the interface specification requirements, control is directed to process 611, where a further stage of generating module instructions is provided, in order to "de-bug" the instructions which have been generated previously. Thus process 612 is repeated until the module instructions generated in process 611 conform to the module interface specifications.

In process 613 a question is asked as to whether there are any other modules remaining which have yet to be considered. If there are more modules remaining to be considered, control is directed back to process 608, and the processes which have just been described are repeated again. Alternatively, control is directed to process 614. In process 614 module instructions are converted to executable instructions by a process of compilation. In process 615 the executable instructions generated in process 614 are downloaded to the storage means 605 in the switching system 601.

Figure 7:
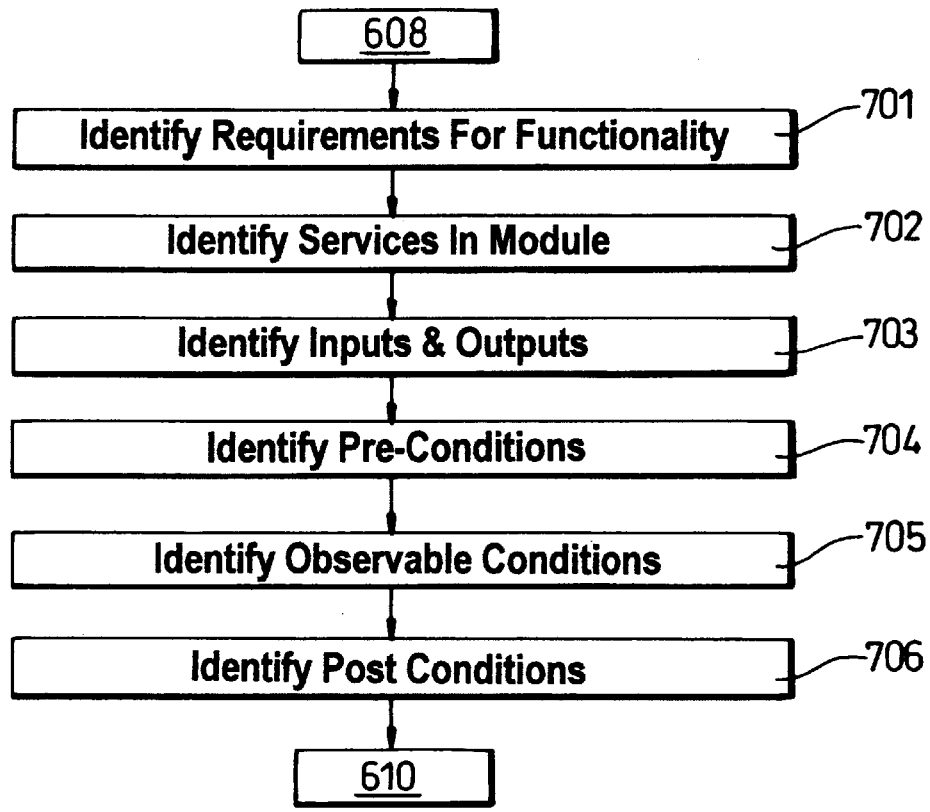
FIG. 7 details steps which are performed in order to implement the process of specifying a module interface which is shown in FIG. 6.

The process 609 for specifying a module interface shown in FIG. 6 is detailed in FIG. 7. FIG. 7 summarises the sequence of processes which are required in order to define a formal module interface definition in a form which is suitable for generating test cases automatically. Processes 701 to 706 thus correspond to the processes performed by a human operator when transferring the information contained within an interface definition document to an SDL file held on equipment which is capable of generating test cases automatically from that information. It should be made very clear at this point in the explanation that the SDL language is being used to define the interface of a module, rather than its functionality.

In process 701 the requirement for the functionality of the module under consideration is identified. The requirement for functionality identifies the function which the module is to perform, without defining how the module is to actually perform it. In process 702 an identification is made of the services in the module. A module may contain one or several services which are callable from other modules. Thus each of these services is identified in process 702. In process 703 all of the inputs and outputs to the module are identified. This includes the types of data as well as the names of the parameters which are used. For example identification is performed of integer-variables, real variables, string variables etc. where these are inputs or outputs. Thus in process 703 each input and output variable is specified explicitly. In process 704 an identification is made of the preconditions. An example of a precondition is a specification of a range of values which may be taken by an integer-variable which has been specified as an input in process 703. Thus, for example, a signed integer which may normally have a range of −65536 to +65535 may have a precondition imposed upon this range such that it may only take the values in the range zero to ten.

A precondition is a decision statement in a procedure whose evaluation (true or false) leads to the execution of one or more post-condition statements. The following example protel fragment shows each type of decision construct possible in the Protel language.

```
IF (tlirc ^= tli_ok) THEN
    swerrorint (CAST tlirc AS INT);
    RETURN FALSE;
ELSE
    CASE user_info.htype IN
    {ethernet_htype} : ethernet_type_str -> tempstr;
    {fts_htype} : fts_type_str -> tempstr;
    OUT    bad_hwtype_str -> tempstr;
    ENDCASE;
ENDIF;
WHILE (entry_ptr ^= NIL) DO
    CAST (CAST entry_ptr AS $UNIVERSAL_PTR)
    AS t_boot_internal_info_ptr -> info_ptr;
    IF ^info_ptr@.used THEN
        RETURN FALSE;
    ENDIF;
    TRUE -> link_clear;
    nextinq1(bootp_internal_db_q, entry_ptr) -> entr_ptr;
ENDDO;
RETURN TRUE;
```

For this example code fragment, pre-conditions would be specified as follows:
PRE-CONDITIONS
1. (tlirc^=tli_ok)
2. user_info.htype {ethernet_htype}
3. user_info.htype {fts_htype}
4. user_info.htype OUT
5. (entry_ptr^=NIL)
6. ^info_ptr@.used The preconditions for a procedure are numbered consecutively.

In process 705 observable conditions are identified. An observable condition is one which exists as a result of having executed the module. Observable conditions may be associated with particular pre-conditions. For example, if a particular precondition, such as an integer range, is violated, an observable condition for that particular pre-condition violation is identified. In process 706 post-conditions are identified. A post-condition is one which arises from having executed the module. In this respect a post-condition is similar to an observable condition. However, post-conditions are typically changes in variables which are not explicitly returned by the module once it has executed. Thus changes in global variables may occur as a result of executing a module. Thus the processes shown in FIG. 7 provide a full description of the way in which a particular module interacts with its environment with a switch. The function which the module actually performs is described in process 701. However, the methods by which functionality of a module is actually achieved are not defined. The process of defining a method of achieving functionality is part of process 611 shown in FIG. 6.

A postcondition is classified as one of the following:
1. An explicit modification of an update parameter.
2. An implicit modification of an update parameter via a subordinate procedure.
3. An explicit modification of an external data symbol. An external data symbol is defined as any data symbol defined outside the scope of the current procedure.
4. An explicit modification of an external data symbol via a subordinate procedure.
5. A procedure return value.

Figure 8:
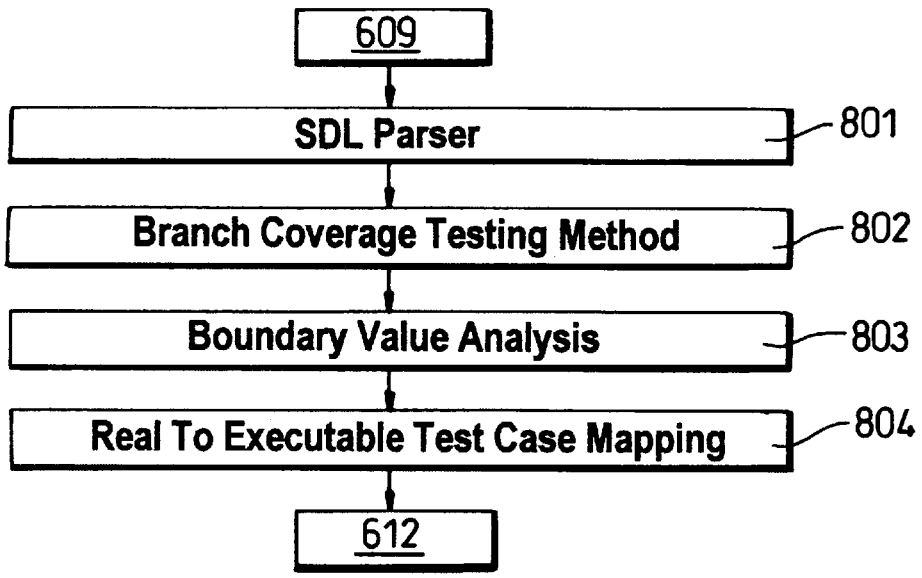
FIG. 8 details steps required to implement the process of generating test cases shown in FIG. 6, including a branch coverage testing method and boundary value analysis.

The process 610 of generating test cases shown in FIG. 6 is detailed in FIG. 8. In process 801 the formal definition of the module's interface which has now been defined in the SDL format, is parsed to provide a linked list representation of the structure defined in SDL. This linked list representation of the module's interface definition makes it possible to perform the remaining processes 802, 803 and 804 shown in FIG. 8.

The branch coverage testing method process 802, shown in FIG. 8 performs the function of locating test paths in the module interface representation generated in process 801. For interface definitions which do not contain loops, the branch coverage testing method 802 locates the smallest number of paths through the module interface definition which will give full path coverage, i.e. traverse each path at least once. For module interfaces which contain loops, the branch coverage testing method 802 locates the smallest number of paths through the module interface which will give full path coverage, plus one additional path for each loop. If a path contains a loop, the loop will be iterated only once. The branch covering testing method locates two different types of path through the module interface:

an "exit path" is a sequence of nodes which starts at the module interface entry node, and ends at the module interface exit node a "loop path" is a sequence of nodes which starts at the module interface entry node, and ends at a node which is already contained in the path.

Figure 9A:
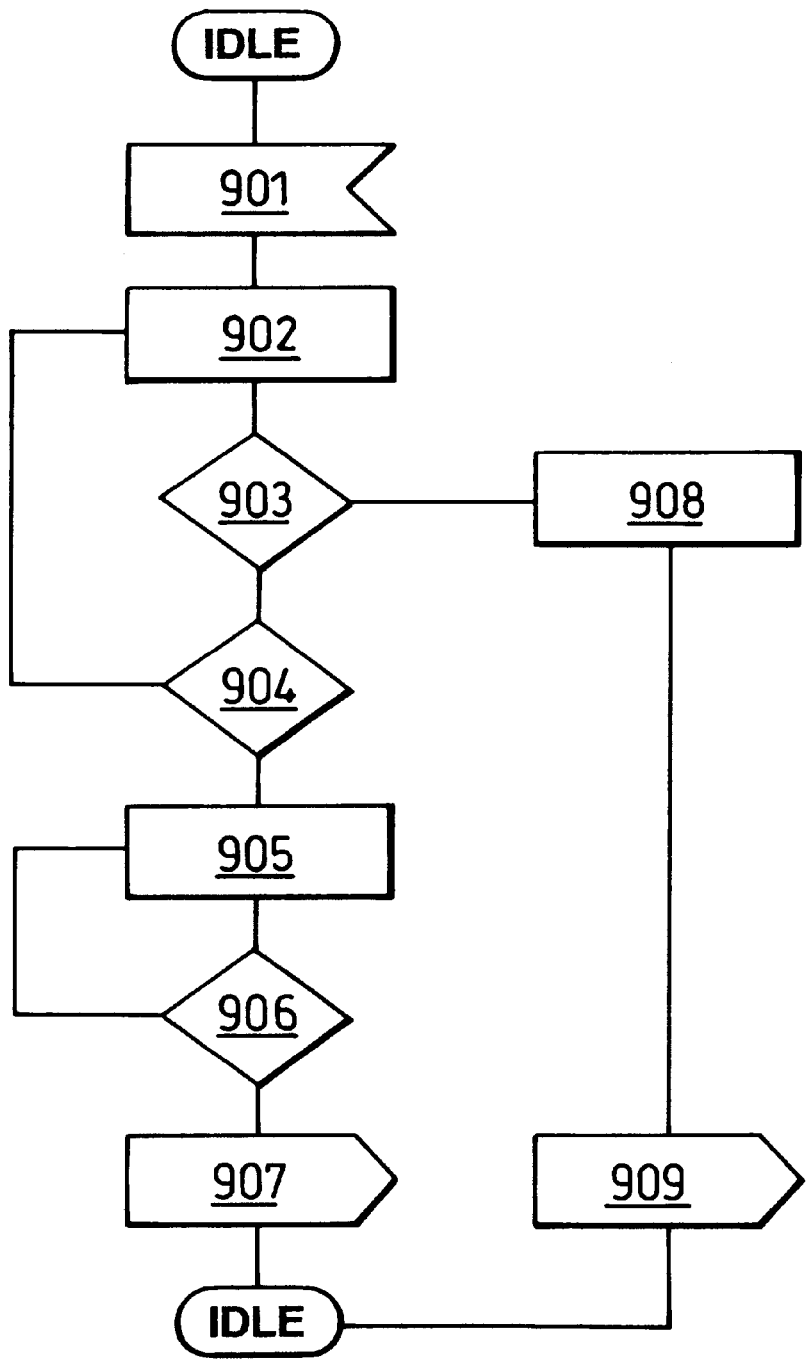
FIG. 9A details a node graph representation of an interface specification generated in the process of specifying a module interface shown in FIG. 6.

FIG. 9A shows a fictitious SDL module interface graph. There are two distinct steps required to generate a list of paths for an interface specification of this type. The two steps are summarised in the flow chart shown in FIG. 9b. In the first step 911, all exit paths and loop paths in the interface specification node graph are identified. In the second step 912, all the loop paths identified in step 911 are converted into exit paths.

Figure 9B:
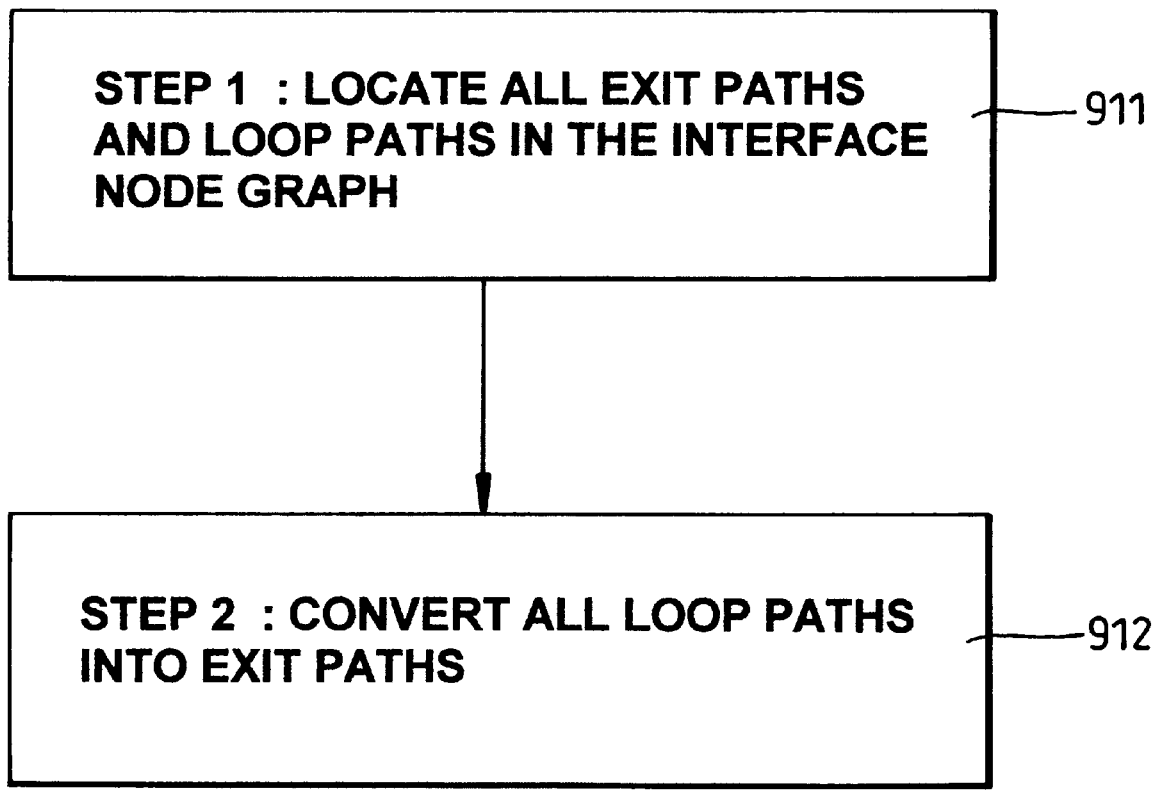
FIG. 9B details two steps which are used to implement the process of the branch coverage testing method shown in FIG. 8, including a first step and a second step.
Figure 9C:
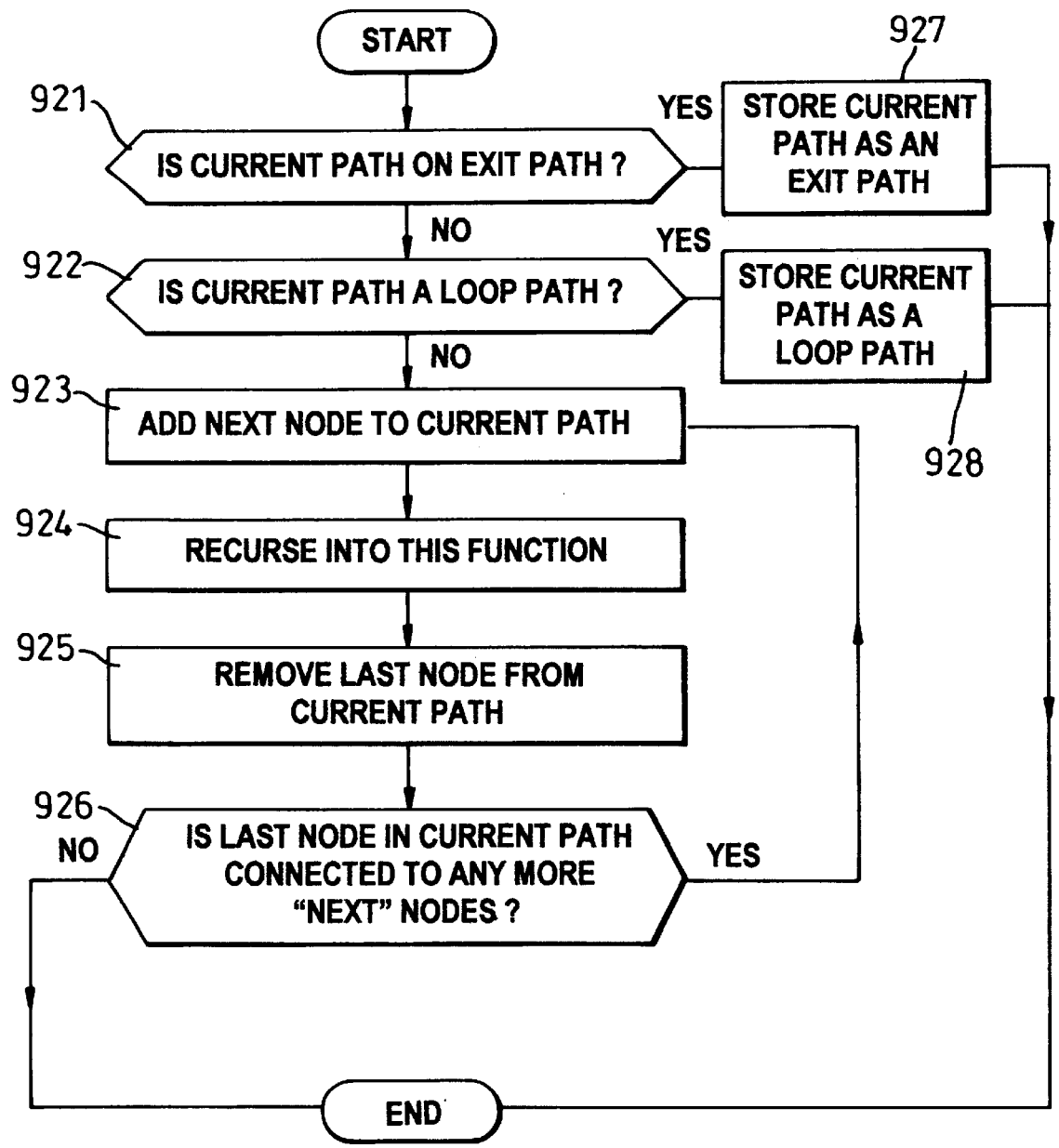
FIG. 9C details the implementation of the first step shown in FIG. 9B.

The first step 911 shown in FIG. 9b is detailed in FIG. 9c. Before performing the processes shown in FIG. 9c an initialisation is performed of the "current path", which is referred to throughout FIG. 9c. The current path is initialised to contain a reference to the first node 901 in the interface graph shown in FIG. 9A. Throughout operation of the processes shown in FIG. 9c, the current path grows and shrinks as nodes are added to its end and removed from its end respectively.

In process 921 a question is asked as to whether the last node in the current path is NOT connected to any other nodes. This provides an indication as to whether the current path is an exit path. If the current path is an exit path, control is directed to process 927. Alternatively, control is directed to process 922.

In process 922 a question is asked as to whether the last node in the current path appears more than once in the current path. This provides an indication as to whether the current path is a loop path. If the current path is a loop path, control is directed to process 928. Alternatively, control is directed to process 923.

In process 923, the node which is connected to the last node in the current path is connected to the current path, thus increasing the length of the current path by one node. In process 924, the processes 921, 922 and 923, which have already been described, are repeated, this time for the new version of the current path. Thus the process summarised in the flowchart of FIG. 9c is recursive; in that it calls itself with a modification to the current path.

In process 925, the recursed version of the process has returned with a modified version of the current path. The last node is then removed from the current path. In process 926 a question is asked as to whether the last node in the current path is connected to any other nodes further down the graph connection list. If the result of this question is 'YES', control is directed back to process 923. Alternatively, the final exit node has been found, with all paths found, and the process summarised by the flowchart of FIG. 9c terminates.

In process 927 a condition has been reached where an exit path has been found. Thus the current path is stored as an exit path, and the process terminated. In process 928, a loop path has been identified and the process may be terminated. Note that termination of the process may result in a return to a previous level of iteration of the flowchart shown in FIG. 9c.

Figure 9D:
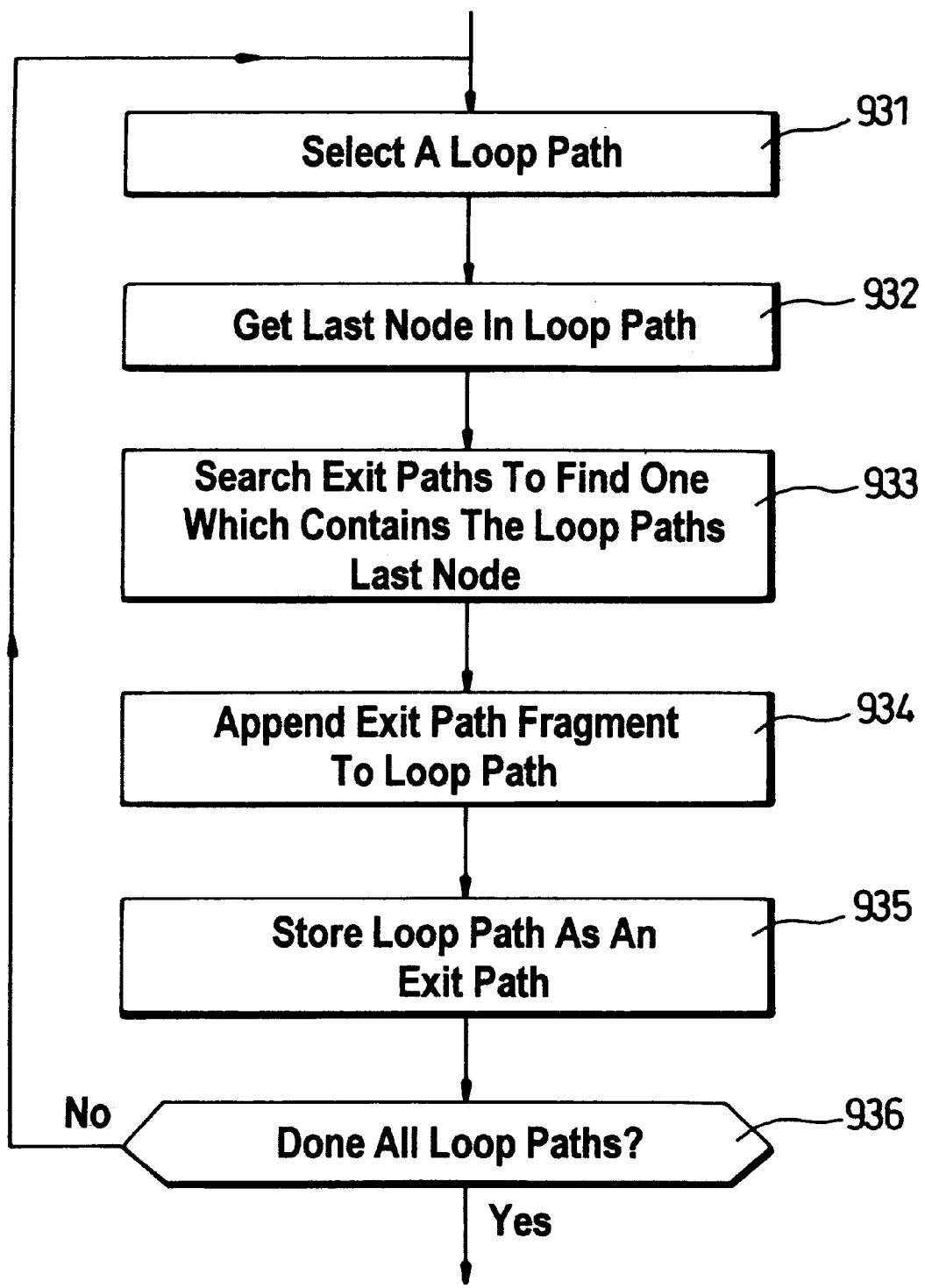
FIG. 9D details the implementation of the second step shown in FIG. 9B.

The process 912, for converting all loop paths to exit paths, shown in FIG. 9b is detailed in FIG. 9d. In process 931 a loop path (identified in process 912 and in FIG. 9c) is selected. In process 932, the last node in the loop path is identified. In process 933, a search is made of all exit paths to find an exit path which contains the loop path's last node. In process 934, the exit path fragment identified in process 934 is appended to the loop path, such that the loop path is no longer a loop. In process 936, a question is asked as to whether there are any further remaining loop paths which require conversion. If there are more loop paths remaining, control is directed to process 931, and the processes 931 to 935 are repeated for the next loop path conversion. Alternatively, all loop paths have been converted, and the process of loop path to exit path conversion has been completed.

A worked example of path identification and conversion, with reference to FIG. 9A, will now be given.

Step 1

A recursive path walk is performed in order to locate all exit paths and all loop paths contained in the module interface definition. Starting at the interface entry node, follow all connections, building up a "current path" node-by-node. Step 1 is complete when all connections have been traversed at least once.

901-902-903

Node 903 connects to more than one other node. Walk each connection in turn (e.g. walk to node 908 first).

(901-902-903)-908-909

End of service reached. Store current path as an exit path. Go back to node 903 and walk the other connection (to node 904).

(901-902-903)-904

Node 904 connects to more than one other node. Walk each connection in turn (i.e. walk to node 902 first).

(901-902-903-904)-902

Node 902 is already in the current path. Store current path as a loop path. Go back to node 904 and walk the other connection (to node 905).

(901-902-903-904)-905-906

Node 906 connects to more than one other node. Walk each connection in turn (i.e. walk to node 907 first).

(901-902-903-904-905-906)-907

End of module definition reached. Store current path as an exit path. Go back to node 906 and walk the other connection (to node 905).

(901-902-903-904-905-906)-905

Node 905 is already in the current path. Store current path as a loop path. All connections have now been traversed. So far the pathfinder has located these paths:

| | |
|---|---|
| Exit paths: | |
| | 901-902-903-908-909 |
| | 901-902-903-904-905-906-907 |
| Loop paths: | |
| | 901-902-903-904-902 |
| | 901-902-903-904-905-906-905 |

Step 2

Loop paths cannot be tested, because they do not represent a complete path through the module's interface definition. Each loop path is converted into an exit path.

Examine the first loop path 901-902-903-904-902: the last node in this path is node 902. Now examine each exit path to find a path which contains node 902: the exit path 901-902-903-908-909 contains node 902. Find the sequence that follows node 902 in this exit path. Sequence is 903-908-909

Now append this sequence to the loop path: 901-902-903-904-902+903-908-909=901-902-903-904-902-903-908-909 which is a new exit path.

Similarly for the second loop path: exit paths are examined for a sequence which can appended to the loop path. Second loop path becomes: 901-903-904-905-906-905+906-907=901-902-903-904-905-906-907

Having converted all loop paths to exit paths, the located paths are:

| | |
|---|---|
| Exit paths | |
| | 901-902-903-908-909 |
| | 901-902-903-904-905-906-907 |
| | 901-902-903-904-902-903-908-909 |
| | 901-902-903-904-905-906-905-906-907 |
| Loop paths | |
| | none |

The paths which have been generated may now be used to generate test cases. For each of the paths which have been identified above characteristics of a module's behaviour, as seen by other modules through its interface, may be defined. Some of the nodes shown in FIG. 9A include pre-conditions, others post-conditions and so on according to the steps shown in FIG. 7. Thus each path which has now been identified may be associated with a range of parameter entry and exit values and observable effects. This information may be useful in itself as part of the process of generating module instructions 611. However, having completed the process 802 of branch coverage testing, specific values may now be selected from within the range of values identified as being valid for each of the paths which has just been identified.

In process 803, boundary value analysis is performed on the various pre-conditions defined in FIG. 7, in order to generate a set of test values for each of the paths which has been identified in association with FIG. 9A. Values are selected in order to test the validity of the module's interface using parameter values across a broad range of possible values. However, it is impractical to consider all possible permutations of the values which will be supplied to any module, as the number of permutations for this is practically infinite.

An example of a set of pre-conditions identified for a particular path through a module interface definition is shown in FIG. 10A. A range of possible values for a variable "x" between zero and ten is shown in line 1001. In line 1002 a range of values for a variable "y" is similarly defined. In line 1003 a Boolean variable "z" is defined as being able to take the value TRUE or FALSE. In line 1004 a string variable "a" is shown as being able to take any of three possible text strings. Thus in lines 1003 and 1004 values are explicitly defined, whereas in lines 1001 and 1002 a range of values is defined.

In FIG. 10B these variables are arranged in tabular form. The explicitly defined values for the variables "z" and "a" are shown, with five different values for the variables "x" and "y". The values which are chosen for variables x and y are chosen according to known techniques for boundary value analysis.

Test cases are generated from the table shown in 10B. Five test cases are summarised in tabular form in FIG. 10C. It can be seen that not all permutations of the test case values generated in FIG. 10B are actually used for test cases, as the number of permutations would be excessively high. Preferably, values are chosen such that each of the values defined in the table shown in FIG. 10B is used at least once. Thus each of the values chosen for the variables x and y is used once, and each of the values for the variables z and a may be used once or several times. Thus FIG. 10C defines five test cases which are to be used on one of the paths derived from the graph shown in FIG. 9A. By defining a set of test cases for each of the possible which has been derived from the graph in FIG. 9A, a test case suite is created which may be automatically used to test the validity of module interactions in accordance with the formal module interface definitions.

In process 804, shown in FIG. 8, the test case suits generated in process 803 are converted into instructions for calling the module whose interface specification is to be tested. Thus, the result of process 804 is a sequence of instructions which may used in process 612 in FIG. 6 to test the module conformity. If the module fails to conform to the module of its interface, it will be necessary to generate modified module instructions in process 611, until the test at process 612 is successful.

In a further embodiment, the post-conditions are listed and correlated with their associated pre-conditions by use of a pre-and post-condition behaviour matrix. This matrix, which is illustrated in FIG. 11 and corresponds to the Protel fragment described above, is to be read from to to bottom. In doing so it is possible to deduce which pre-conditions must be met to achieve a particular post-condition. The preconditions are displayed in columns 1 to 5 and the corresponding post-conditions are listed down the rows. It is possible to achieve combinations of post-conditions if the corresponding pre-conditions are met. It should be noted that pre-conditions that relate in a "return" post-condition will not be satisfied if post-conditions listed further down the matrix are to be achieved.

The interpretation of the behaviour matrix of FIG. 11 is illustrated in FIGS. 12 and 13. In the matrix shown by way of example in FIG. 12, the designer wishes to know under what circumstances the global flag "link_clear gets set true and carries out the following process steps.

1. Locate the desired "TRUE→link_clear" post-condition.
2. Deduce which pre-conditions will cause this post-condition by examining the line which contains the post-condition text. In the example of FIG. 12, pre-condition 5 must evaluate true to give the desired post-condition.
3. Examine all post-conditions preceding the desired "TRUE→link_clear" post-condition. All "return" post-conditions must fail at least one of their corresponding pre-conditions in order to achieve the desired post-condition.

The effect of preceding post-conditions is illustrated in FIG. 13. In this example there are two preceding "return" post-conditions and the following process steps are carried out.

4. The row above the desired "TRUE→link_clear" post-condition contains a "return" post-condition. To achieve the desired post-condition, this preceding "return" post-condition must not occur. Therefore the logical combination of preconditions 5 and 6 must evaluate false.
5. Looking further up the matrix from the desired post-condition, the top line contains a "return" post-condition, to achieve the desired post-condition, this preceding "return" post-condition must not occur. Therefore, pre-condition 1 must evaluate false.

By testing the module interfaces in this way, it is possible to provide an improved module development environment. If modules are written to conform successfully to their module interface specifications, instructions for other modules may be generated more reliably, given that any faults which may occur within them are less likely to have resulted from a fault in the one of the modules whose interface specifications have been met.

We claim:

1. A processing arrangement for testing operation of a new or replacement software module in a set of operating instructions for telecommunications switching apparatus, the set of operating instructions comprising a plurality of mutually interacting modules for conversion into control instructions executable by the switching apparatus, each said module having a definition of its function and the manner in which it interacts with other modules, the processing arrangement comprising:

means for selecting the new or replacement module for testing;

means for defining a formal interface definition of the selected module;

means for generating module instructions corresponding to the definition of the selected module;

test procedure generation means for generating test procedures for the selected module based on said generated module instructions;

testing means for applying said test procedures to the module and for determining conformity with said interface definition;

converting means for converting a tested and conforming module into executable instructions for the switching apparatus, and means for downloading said executable instructions to the switching apparatus;

wherein said means for defining a formal interface definition comprise means for identifying the functionality of the selected module, means for identifying within the module services which are callable from other modules, means for specifying input and output variables for the module, means for identifying preconditions for the module, means for identifying observable conditions associated with said preconditions, and means for identifying postconditions resulting from execution of the module whereby to determine the manner in which the selected module will interact when converted to executable instructions and downloaded to the switching apparatus.

2. A processing arrangement as claimed in claim 1, wherein said test procedure generation means comprises, means for parsing the formal interface definition of the selected module into a linked list representation, means for locating test paths in said linked list representation, means for performing a boundary value analysis on said preconditions whereby to generate test values for each of said located paths, and means for selecting sets of said test values whereby to generate test cases for the selected module.

3. A method of testing operation of a new or replacement software module in a set of operating instructions for telecommunications switching apparatus, the set of operating instructions comprising a plurality of mutually interacting modules for conversion into control instructions executable by the switching apparatus, each said module having a definition of its function and the manner in which it interacts with other modules, the method comprising the steps of:

selecting the new or replacement module for testing;

defining a formal interface definition of the selected module;

generating module instructions corresponding to the definition of the selected module;

generating test procedures for the selected module based on said generated module instructions;

applying said test procedures to the module so as to determine conformity with said interface definition;

converting a tested and conforming module into executable instructions for the switching apparatus, and downloading said executable instructions to the switching apparatus;

wherein said step of defining a formal interface definition comprises identifying the functionality of the selected module, identifying within the module services which are callable from other modules, specifying input and output variables for the module, identifying preconditions for the module, means for identifying observable conditions associated with said preconditions, identifying postconditions resulting from execution of the module whereby to determine the manner in which the selected module will interact when converted to executable instructions and downloaded to the switching apparatus.

4. A method as claimed in claim 3 wherein said test procedure generation step comprises, parsing the formal interface definition of the selected module into a linked list representation, locating test paths in said linked list representation, performing a boundary value analysis on said preconditions whereby to generate test values for each of said located paths, and selecting sets of said test values whereby to generate test cases for the selected module.

5. A method as claimed in claim 4, wherein said test paths comprise loop paths and exit paths, and wherein said loop paths are converted into exit paths prior to applying said test procedures to the module.

6. A method as claimed in claim 4 wherein said pre-conditions and post-conditions are arranged as a matrix whereby to provide correlation of said pre-conditions and post-conditions.

* * * * *